(12) United States Patent  (10) Patent No.: US 8,094,168 B2
Carnahan et al.  (45) Date of Patent: Jan. 10, 2012

(54) ADDING SECONDARY CONTENT TO UNDERUTILIZED SPACE ON A DISPLAY DEVICE

(75) Inventors: Jeffrey Douglas Carnahan, New York, NY (US); Michael Novi, Brooklyn, NY (US); Bill Burton, Highland, NY (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/866,579

(22) Filed: Oct. 3, 2007

(65) Prior Publication Data

US 2009/0091578 A1 Apr. 9, 2009

(51) Int. Cl.
*G09G 5/00* (2006.01)
(52) U.S. Cl. ........ 345/619; 345/581; 345/635; 345/660; 345/694; 345/698
(58) Field of Classification Search .................. None
See application file for complete search history.

(56) References Cited

U.S. PATENT DOCUMENTS

| | | | |
|---|---|---|---|
| 6,677,964 B1 * | 1/2004 | Nason et al. ................. | 715/764 |
| 6,966,036 B2 | 11/2005 | Nason et al. | |
| 7,000,008 B2 | 2/2006 | Bautista-Lloyd et al. | |
| 7,171,402 B1 | 1/2007 | Chatani | |
| 2002/0087988 A1 | 7/2002 | Lipscomb et al. | |
| 2003/0106022 A1 | 6/2003 | Goodacre et al. | |
| 2004/0267873 A1 | 12/2004 | Shen et al. | |
| 2005/0052573 A1 * | 3/2005 | Schiller ........................ | 348/445 |
| 2006/0026000 A1 | 2/2006 | Bodin et al. | |
| 2006/0123347 A1 | 6/2006 | Hewitt et al. | |
| 2007/0113179 A1 | 5/2007 | Gibbs et al. | |
| 2007/0130089 A1 | 6/2007 | Chin | |
| 2007/0174291 A1 | 7/2007 | Cooper et al. | |

FOREIGN PATENT DOCUMENTS

| | | | |
|---|---|---|---|
| JP | 2002215509 | * | 8/2002 |
| KR | 20000036656 A | | 5/2000 |
| KR | 20020013165 A | | 2/2002 |
| WO | WO 0223372 | * | 3/2002 |

OTHER PUBLICATIONS

Iqbal Mohomed, Jim Chengming Cai, Sina Chavoshi, and Eyal De Lara, "Context-Aware Interactive Content Adaptation," MobiSys '06, Jun. 19-22, 2006, Uppsala, Sweden, Copyright 2006 ACM 1-59593-195-3/06/0006, 14 pages, University of Toronto, Toronto, Ontario, Canada, http://www.cs.toronto.edu/-delara/papers/sys7585-mohomed.pdf.
Robson Eisinger, and Rudinei Goularte, "Towards Context-based Dynamic Video Adaptation," WebMedia '2005, Pocos de Caldas, Minas Gerais, Brazil, Copyright 200X ACM X-XXXXX-XX-X/XX/XX, 3 pages, Sao Carlos, SP—Brazil, http://delivery.acm.org/10.1145/1120000/1114242/p19-eisinger.pdf?key1=1114242&key2=8334506811&coll=GUIDE&dl=GUIDE&CFID=30501147&CFTOKEN=10623401.
PCT/US2008/077318 Search Report date of mailing: Apr. 29, 2009, International Filing Date: Sep. 23, 2008.

* cited by examiner

*Primary Examiner* — Kee M Tung
*Assistant Examiner* — Jwalant Amin
(74) *Attorney, Agent, or Firm* — Shook, Hardy & Bacon L.L.P.

(57) ABSTRACT

Systems, methods, and computer-readable media for adding a secondary content to a display with underutilized space are provided. If a primary content, such as a movie, does not fill the entire display then the display includes underutilized space. The dimensions and location of underutilized space, if any, is determined using the characteristics of the display and the primary content. Secondary content, such as advertisements, may then be displayed in the underutilized space.

20 Claims, 7 Drawing Sheets

ADDING SECONDARY CONTENT TO UNDERUTILIZED SPACE ON A DISPLAY DEVICE

BACKGROUND

With the large variety of visual media formats available, and large variety of display devices on which the media may be presented, it is often the case that a display device is not optimized to present the media format it is asked to display. In such cases, the non-optimized display device may present the media content using only a portion of the display. For example, a standard definition television displays a wide screen movie with black bars above and below the movie. The black bars represent portions of the display in which content is not presented. In another example, a video game may not use the entire computer monitor. The video game may be presented in a window that does not fill the entire monitor, or, if the window fills the entire monitor, then the video game may not fill the entire window. In either situation, the entire monitor is not used by the video game.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention recognize underutilized space on a display device, such as a television. Underutilized space is any area on the display screen not occupied by a primary content, such as a movie. Underutilized space often occurs when the display device is presenting media content that it is not optimized to present. The underutilized space may be identified by comparing characteristics of the display device with characteristics of the media content. Once underutilized space is identified, a secondary content may be displayed in the underutilized space concurrently with the primary content.

BRIEF DESCRIPTION OF THE DRAWINGS

The present invention is described in detail below with reference to the attached drawing figures, wherein.

DETAILED DESCRIPTION

Embodiments of the present invention recognize underutilized space on a display device, such as a television. Underutilized space is any area on the display screen not occupied by a primary content, such as a movie. For example, a standard definition television displays a wide screen movie with black bars above and below the movie. These black bars are underutilized space. Once underutilized space is identified, a secondary content, such as an advertisement, may be presented within the underutilized space.

Figure 1A:
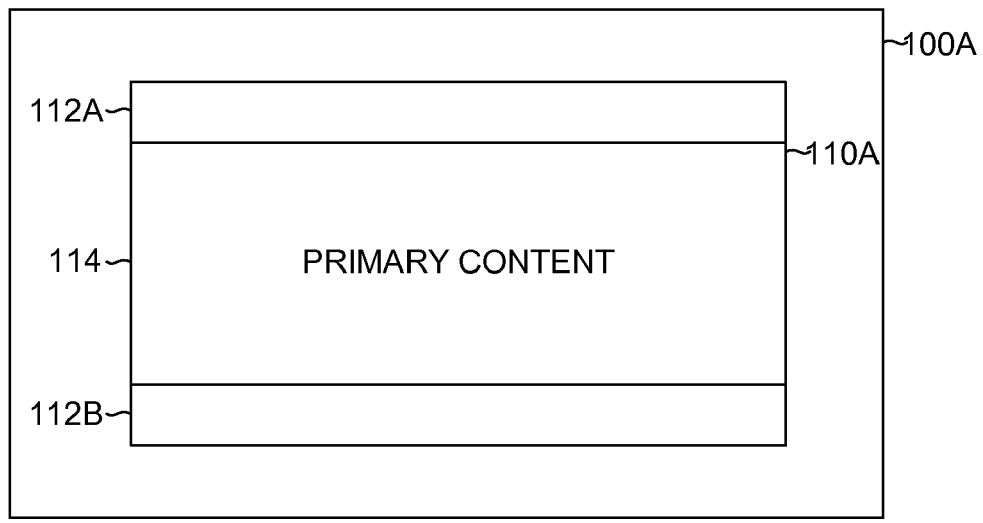
FIG. 1A is an illustration of a display device presenting primary content with horizontally-oriented underutilized space, into which secondary content may be added, above and below the primary content.
Figure 1B:
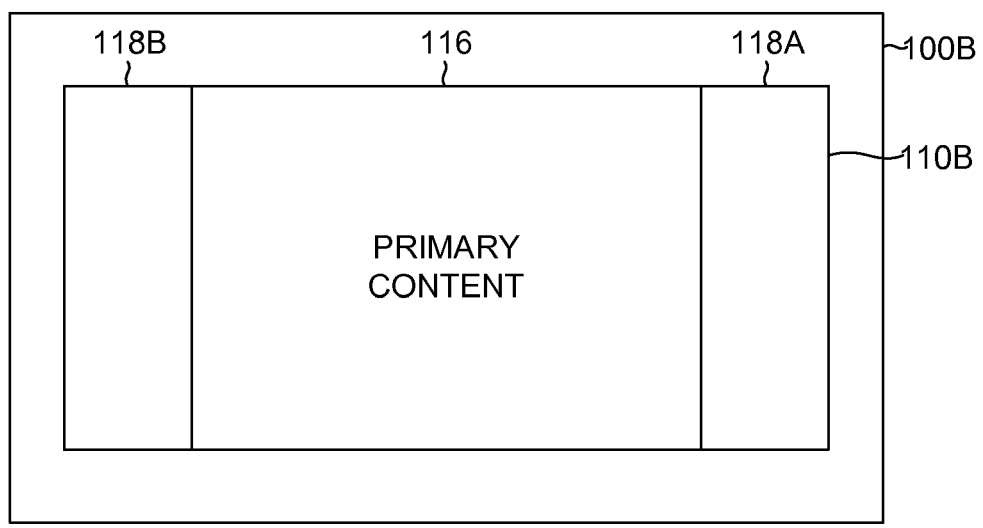
FIG. 1B is an illustration of a display device presenting primary content with vertically-oriented underutilized space, into which secondary content may be added, on either side of the primary content.
Figure 1C:
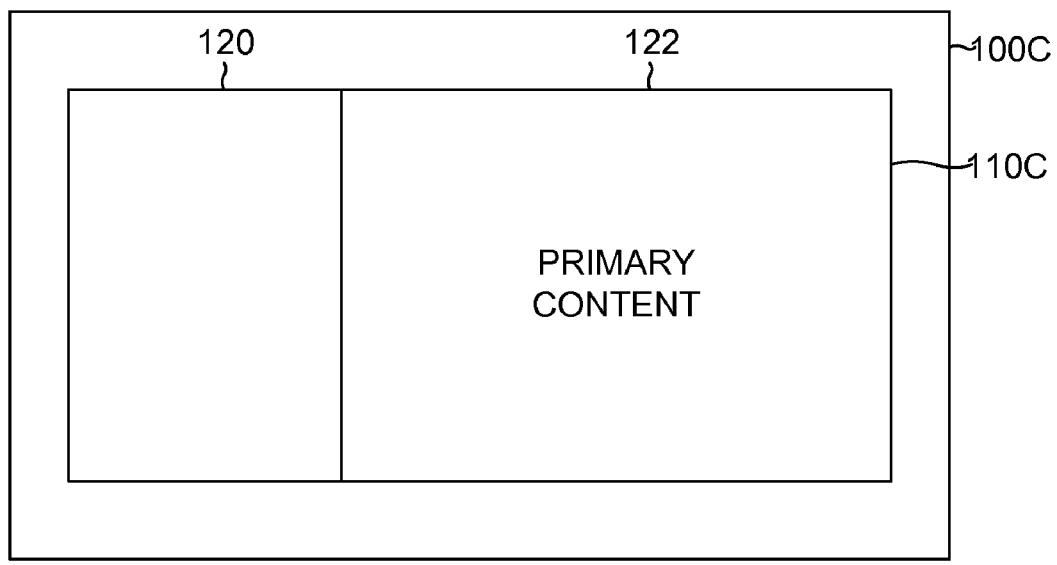
FIG. 1C is an illustration of a display device presenting primary content with underutilized space, into which secondary content may be added, on one side of the primary content.

Understanding the concept of underutilized space is key to understanding embodiments of the present invention. As stated, underutilized space is an area of the screen on a display device that is not occupied by primary content. If primary content fills the entire display device there is no underutilized space. Underutilized space may occur on any portion of the display device. Examples of underutilized space 112A-B, 118A-B, and 120 are illustrated in FIGS. 1A-C. The examples of underutilized space in FIGS. 1A-C are not comprehensive. They represent a few common scenario's where underutilized space may be present. While FIGS. 1A-C show rectangular displays and rectangular shaped primary content, both the primary content and the display device could be any shape.

With regard to FIG. 1A, an illustration of a display device 100A having horizontally-oriented underutilized spaces 112A-B above and below the primary content 114 is shown. The display device 100A includes a display screen 110A. This situation may occur, for example, when a wide screen movie is shown on a standard definition television or other display device 100A that is not optimized to show wide screen movies. Embodiments of the present invention may cause secondary content, such as an advertisement, to be displayed within the underutilized spaces 112A-B. The secondary content may fill all or only a portion of the underutilized space.

With regard to FIG. 1B, an illustration of a display device 100B having vertically-oriented underutilized spaces 118A-B to the right and left of the primary content 116 is shown. The display device 100B includes a display screen 110B. This situation may occur, for example, when a primary content 116 in standard definition format is shown on a high-definition television or other display device 110A that is not optimized to show media formatted for standard definition television. Embodiments of the present invention may cause secondary content, such as an advertisement, to be displayed within underutilized spaces 118A-B. The secondary content may fill all or only a portion of the underutilized space.

With regard to FIG. 1C, an illustration of a display device 100C having underutilized space 120 on one side of the primary content 122 is shown. The display device 100C includes a display screen 110C. This situation may occur when the display device 100C is not optimized to display the primary content's format. Embodiments of the present invention may cause secondary content, such as an advertisement, to be displayed within underutilized space 120. The secondary content may fill all or only a portion of the underutilized space.

The present invention may be embodied in a variety of forms including, but not limited to, a system, a method, an apparatus, or a computer-readable media. These forms may be practiced in several different operating environments that include an almost endless combination of components. Examples of operating environments that are suitable for practicing the present invention are provided in FIGS. 2-5. Referring to the drawings in general, and initially to FIG. 2 in particular, an exemplary operating environment is shown and designated generally as computing device 200. Computing device 200 is but one example of a suitable computing environment and is not intended to suggest any limitation as to the scope of use or functionality of the invention. Neither should the computing environment 200 be interpreted as having any dependency or requirement relating to any one or combination of components/modules illustrated.

The invention may be described in the general context of computer code or machine-useable instructions, including computer-executable instructions such as program components, being executed by a computer or other machine, such as a television, DVD player, game console, personal digital assistant (PDA), mobile phones, or other handheld device. Generally, program components including routines, programs, objects, components, data structures, and the like, refer to code that performs particular tasks, or implements particular abstract data types. Embodiments of the present invention may be practiced in a variety of system configurations, including hand-held devices, consumer electronics, general-purpose computers, specialty computing devices, and the like. Embodiments of the invention may also be practiced in distributed computing environments where tasks are performed by remote-processing devices that are linked through a communications network.

Figure 2:
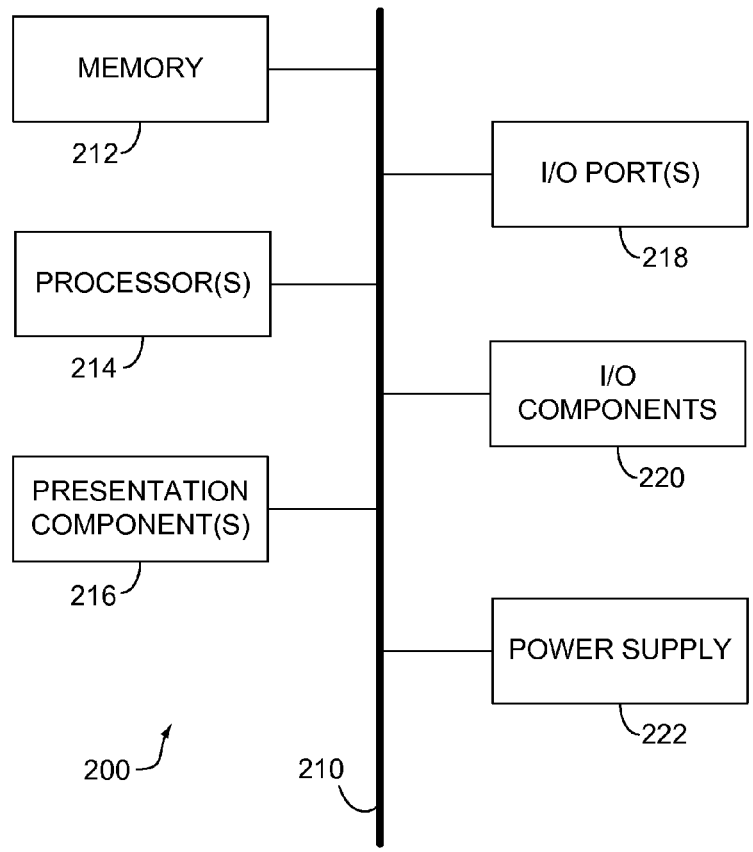
FIG. 2 is a block diagram of an illustrative operating environment in which embodiments of the present invention may operate.

With continued reference to FIG. 2, computing device 200 includes a bus 210 that directly or indirectly couples the following devices: memory 212, one or more processors 214, one or more presentation components 216, input/output (I/O) ports 218, I/O components 220, and an illustrative power supply 222. Bus 210 represents what may be one or more busses (such as an address bus, data bus, or combination thereof). Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 2 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 2 and referred to as "computer" or "computing device."

Computing device 200 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD), game discs, game cartridges or other optical or holographic media; magnetic cassettes, magnetic tape, magnetic disk storage or other magnetic storage devices, or any other medium that can be used to encode desired information and be accessed by computing device 200.

Memory 212 includes computer-storage media in the form of volatile and/or nonvolatile memory. The memory may be removable, non-removable, or a combination thereof. Exemplary hardware devices include solid-state memory, hard drives, optical-disc drives, etc. Computing device 200 includes one or more processors that read data from various entities such as memory 212 or I/O components 220. Presentation component(s) 216 present data indications to an user or other device. Exemplary presentation components include a display device, speaker, printing component, vibrating component, etc. I/O ports 218 allow computing device 200 to be logically coupled to other devices including I/O components 220, some of which may be built in. Illustrative components include a microphone, joystick, game pad, satellite dish, scanner, printer, wireless device, and the like.

Figure 3:
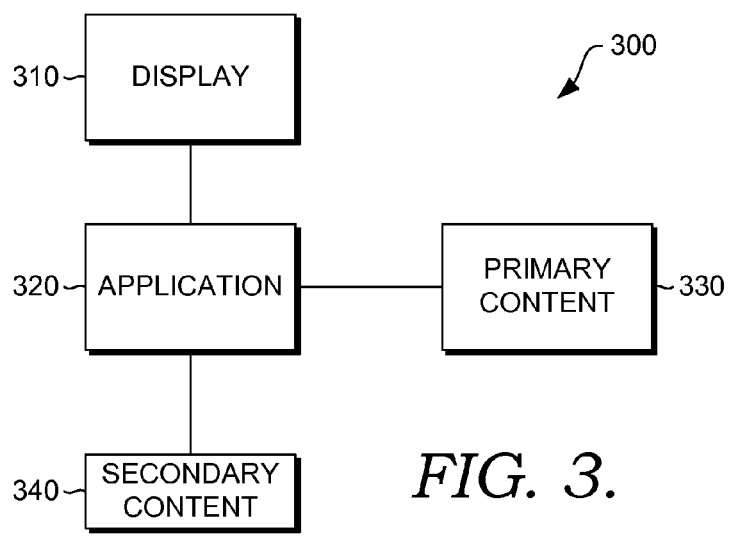
FIG. 3 is a block diagram of a second illustrative operating environment in which embodiments of the present invention may operate.

FIG. 3 shows a more specific illustrative operating environment 300 with additional components and media that may be used with embodiments of the present invention. Operating environment 300 contains a display device 310, a display-space underutilization application 320, a primary content 330, and a secondary content 340. A display device 310 is an electronic device with a display screen that is adapted to show visual media. The display device 310 may contain input devices and output devices, such as speakers. Examples of a display device 310 include, but are not limited to: a high definition television, a standard definition television, a computer monitor, a display on a mobile phone, a display on a digital music player, a video billboard, a display on a personal data assistant, and a display on a handheld video game player. While a display device 310 contains a display screen that presents media, for the sake of simplicity this specification refers to the display device 310 as presenting the media without specifying that the display screen and other components are involved.

Application 320 is embodied on a computer-readable media. Application 320 may be executed by a computing device (not shown), for instance, such as the computing device 200 previously described with reference to FIG. 2. Application 320 is shown apart from a computing device 200 to emphasize the function of application 320 apart from the device or devices on which it resides. For example, application 320 could reside on more than one device that are communicatively coupled to each other in a distributed computing environment. The present invention is not intended to be limited by the computing devices that execute application 320. The operation of application 320 is described in more detail, subsequently, with reference to FIGS. 7-9.

Application 320 is communicatively coupled to a primary content 330 and a secondary content 340. The primary content 330, secondary content 340, application 320 and display device 310 may all reside on, or originate from, a single device or a combination of devices. Application 320 is able to determine characteristics of the primary content 330 and the display device. Application 320 is also able to cause the secondary content 340 to be transmitted to the display device 310.

Primary content 330 is the visual content a person viewing the display is intending to see. Examples of primary content 330 include, but are not limited to: a television show, a movie, a video, a music video, a slide show, an advertisement, and a video game. Secondary content 340 is any visual content that may be displayed within an underutilized space on a display device. Examples of secondary content 340 include, but are not limited to: an advertisement, a video advertisement, an image advertisement, an advertisement containing a hyperlink to additional secondary content 340, an advertisement containing a hyperlink to a webpage accessed via the Internet, secondary game content, an interactive advertisement that is configured to perform an action in response to input received from a content viewer, and supplemental content that is complementary to the primary content 330. An example of secondary content 340 that is complementary to the primary content 330, is information about a television show, such as whether it is a rerun. Sources of primary content 330 and secondary content 340 include, but are not limited to: a DVD, a CD-ROM, a game disc, a hard drive, a flash memory, a cable connection, an Internet connection, a radio signal sent over a mobile telephone network, a radio signal sent via a satellite, and a radio signal sent via a TV transmitting tower. In one embodiment, the user does not intend to view the secondary content.

Figure 4:
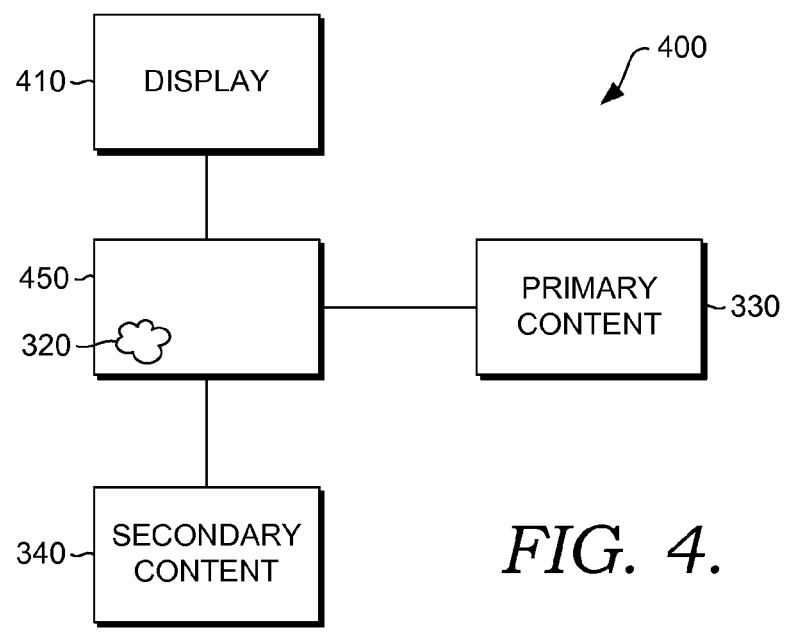
FIG. 4 is a block diagram of a third illustrative operating environment in which embodiments of the present invention may operate.

A third illustrative operating environment 400, in which the present invention may be practiced, is shown in FIG. 4. Operating environment 400 includes a display device 410, a computing device 450, the application 320, primary content 330, and secondary content 340. In operating environment 400, the computing device 450 and display device 410 are two separate devices. The computing device 450 may have features similar to those included in computing device 200 of FIG. 2. Examples of computing devices 450 that could be used in operating environment 400 include, but are not limited to: a personal computer, a game console, a DVD player, a Digital Video Recorder, or a cable box. Application 320 resides on, and is executed by, the computing device 450. The computing device 450 is communicatively coupled to the primary content 330 source, and the secondary content 340 source. The primary content 330 and secondary content 340 may originate from the same content source or different sources.

Figure 5:
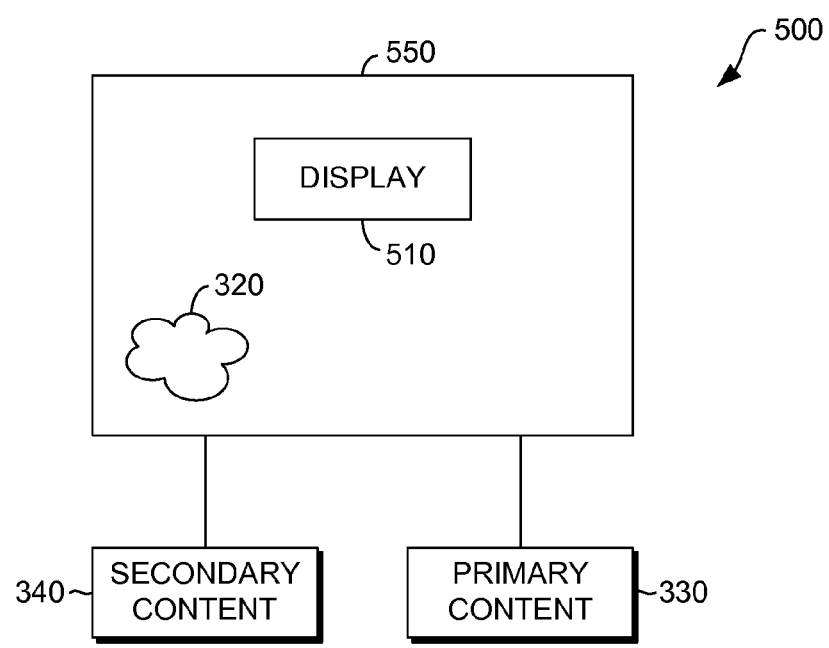
FIG. 5 is a block diagram of a fourth illustrative operating environment in which embodiments of present invention may operate.

An additional illustrative operating environment 500 suitable for practicing the present invention is shown in FIG. 5. Operating environment 500 is similar to operating environment 400, except, in operating environment 500, the display device 510 is integrated with the computing device 550. Examples of computing devices 550 with an integrated display device 510, which may be used in operating environment 500, include, but are not limited to: a standard definition television, a high definition television, a mobile phone, a personal data assistant, a computer with built-in monitor, a laptop computer, a digital music player, a video billboard, and a handheld video game player. Though shown apart from the computing device 550, the primary content 330 and secondary content 340 could reside on the computing device 550. The primary content 330 and secondary content 340 may originate from the same content source or different sources. FIGS. 2-5 provide illustrative examples of possible operating environments in which embodiments of the present invention may be practiced. As stated, the present invention is not intended to be limited by the operating environment. Other suitable operating environments exist that have not been shown for the sake of simplicity. Having described various illustrative operating environments, the present invention will now be described in more detail.

Figure 6:
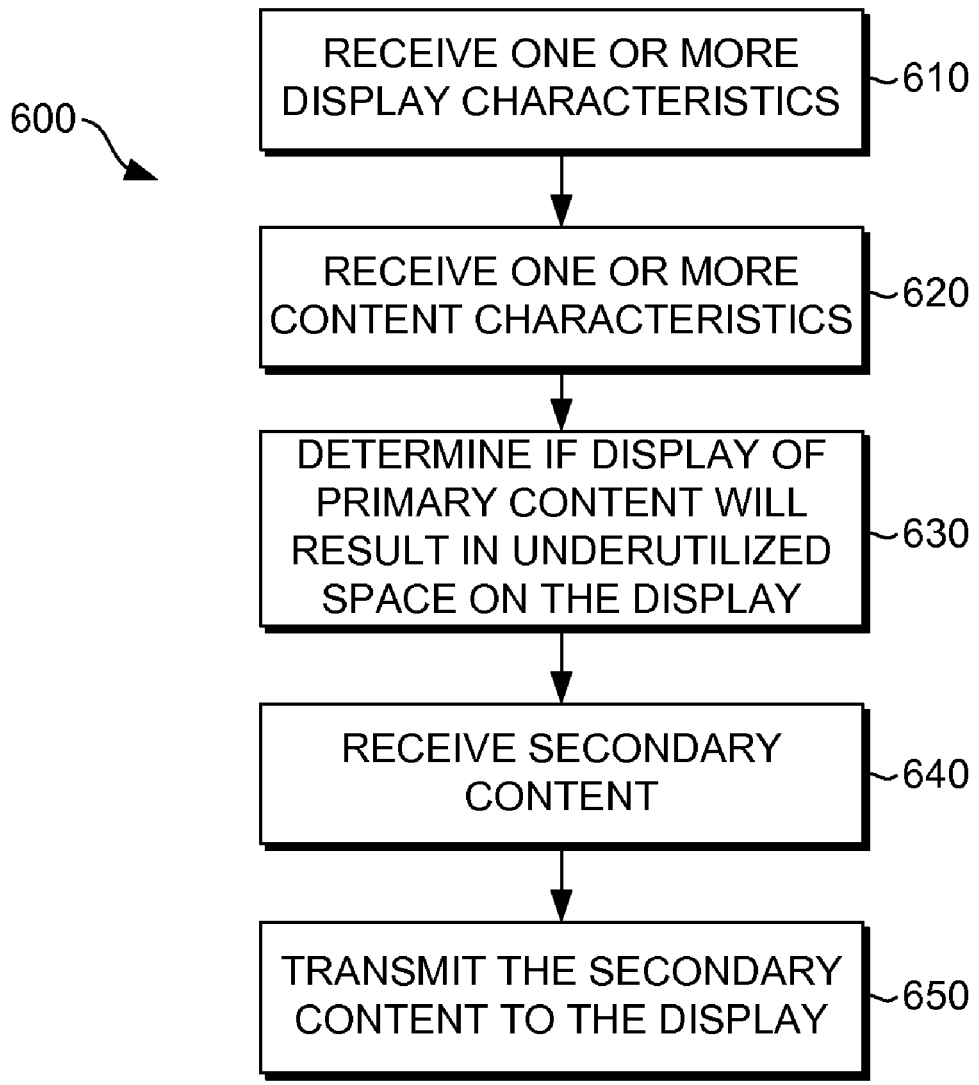
FIG. 6 is flow diagram showing a method for providing a secondary content for presentation with primary content on a display device according to an embodiment of the present invention.

FIG. 6 is a flow diagram illustrating a method 600 that adds a secondary content 340 to an underutilized space on the display device, such as display device 310 on FIG. 3, according to an embodiment of the present invention. At step 610, one or more display characteristics for the display device are received. The display characteristics, such as aspect ratio, dimensions, and content location on the display, could be received a number of different ways in various embodiments of the invention. By way of example and not limitation, in one embodiment, the display characteristics are received from another application that resides on the same computing device that is executing the application 320. For example, if application 320 is operating on a personal computer, then the application could receive the display characteristics by reading a configuration parameter within the operating system that contains the display characteristics. In another embodiment, the display characteristics are received from a second application that is running on a second computing device that is communicatively coupled to the computing device on which application 320 is running. In still another embodiment, the display characteristics are input by a person through an user interface that prompts the person to enter the desired characteristics of a display device. The user interface could be similar to the user interface used when setting up a television, cable box, VCR, or game console. In another embodiment, the display characteristics could be preprogrammed into application 320. For example, the manufacture of a television set could include application 320 in the television set and preprogram it with the display device's 550 characteristics.

At step 620, one or more content characteristics for the primary content 330 are received. The content characteristics, such as aspect ratio and dimensions, may be received in a number of different ways in various embodiments of the present invention. By way of example and not limitation, application 320 may be communicatively coupled to the source of primary content 330. For example, application 320 may monitor the signal being sent from a cable box to a display device 310. In another embodiment, the content characteristics may be sent to application 320 by another application or device.

At step 630, a determination is made regarding the presence or absence of an underutilized space on the display. As stated previously, underutilized space is an area of the screen on a display device that is not occupied by the primary content 330. The determination is made by comparing the display characteristics with the content characteristics. One embodiment for identifying underutilized space is described below with reference to FIG. 7.

At step 640, a secondary content 340 that is adapted for presentation within the underutilized space determined in step 630 is received. As stated previously, secondary content 340 is content that is configured for placement within an underutilized space. At step 650, the secondary content 340 is transmitted to the display device, such that the secondary content 340 is displayed on the display device, within the underutilized space, and concurrently with the primary content 330. Thus, the primary content 330 is displayed as it normally would be on the display device 310, and the secondary content 340 is displayed in the underutilized space adjacent to the primary content 330.

The secondary content 340 may be received from the same source as the primary content 330 or from a different source. By way of example, and not limitation, if the source of the secondary content 340 and primary content 330 is a single DVD, then primary content 330 and secondary content 340 have the same source. On the other hand, if the source of the primary content 330 is a radio signal sent via a TV transmitting tower and the secondary content 340 source is flash memory then the primary content 330 and secondary content 340 have two separate sources. In one embodiment, application 320 is operating on a computing device that is connected to the Internet, and secondary content 340 is received from a media source, such as an ad server or complementary content server, accessible via the internet.

Whether the secondary content 340 is pulled from the same source as the primary content 330 or a secondary source, various factors may be used to choose a secondary content 340 that is optimized for presentation with the primary content 330. The optimization of secondary content 340 may include both technical optimization and subject-matter optimization. With reference to technical optimization, the secondary content 340 may be optimized for display on the display device using the previously received display characteristics. In one embodiment, the display characteristics are used to retrieve a secondary content 340 that requires no alteration before presentation within the underutilized space. For example, if the display device is a standard definition television, then the secondary content 340 may be configured for display on a standard definition television, rather than a high definition television, or a computer monitor. Similarly, if the display device is a mobile phone, the secondary content 340 may be optimized for display on the particular display that is part of the mobile phone. The secondary content 340 may also be optimized for the dimensions, shape, orientation and location of the underutilized space. For example, secondary content 340 that includes a lot of text may not be optimized for a very small underutilized space where the text would be rendered illegible. Similarly, a rectangular secondary content 340 may not be optimized for an underutilized space that is square. Likewise, a horizontally-oriented banner may not be optimized for a vertically-oriented space.

In addition to technical optimization of secondary content through selection, the secondary content may also be adjusted such that it is optimized for the underutilized space. In one embodiment, the secondary content may be truncated such that only a portion of the entire secondary content is displayed in the underutilized space. In another embodiment, the secondary content may be resized to fit the underutilized space. The resizing may include stretching the secondary content along one or more axis. The resizing may also utilize algorithms that stretch the secondary content in such a way as to minimize disruption to the communicative content within the secondary content. For example, the algorithm may cause the secondary content to be distorted more near the edges and less in the middle where communicative content, such as text or pictures, may be more likely to be present.

Regarding subject matter optimization, it may be preferable in some cases to provide secondary content 340 that is relevant and appropriate for the presumptive viewer of the primary content 330. A presumptive viewer, may be a specific person, or a general person with certain characteristics. For example, in the case of a mobile phone, the presumptive viewer would be the owner of the mobile phone, which may be known to application 320. In some cases, however, the presumptive viewer may not be the actual viewer, as application 320 may not know, for instance, that the owner has lent their mobile phone to an unknown person. Nevertheless, the secondary content 340 would be optimized based on the owner. In the case of a general person, application 320 may know that the presumptive viewer is a male, or a certain age, or lives in a particular geographic region. Other characteristics of a generalized person may also be known and can form the basis for providing secondary content 340 optimized based on subject matter.

The subject-matter optimization of the secondary content 340 may also be improved using the subject matter of the primary content 330. For example, the primary content 330 may be a video game rated for adults. In this case, the secondary content 340 may be tailored to an adult versus a child. Conversely, if the primary content 330 is a video game rated for children, then presenting secondary content 340 geared towards children may be the optimum choice. Thus, by using knowledge regarding the presumptive viewer and the subject matter of the primary content 330, the choice of secondary content 340 may be optimized.

Characteristics of the primary content's 330 subject matter may be learned by receiving meta-data that is transmitted with the primary content 330, or by a visual or audio recognition program. For example, some games or television shows contain meta-data that rates the age appropriateness and subject matter of the primary content 330. Optical recognition or audio recognition could also be used in some embodiments. For example, an audio recognition program could listen for certain words and present secondary content 340 that matches that word. When a soft drink is recognized through, for example meta-data, audio recognition, or video recognition, an advertisement for that soft drink could be displayed in the underutilized space.

In one embodiment of the present invention, each secondary-display event is recorded and stored. A secondary-display event is a single instance of displaying a secondary content. This information may be used to charge advertisers for displaying secondary content containing an advertisement. In one embodiment, a secondary content source, such as an ad server, may track each secondary-display event. In another embodiment, a secondary content source may also determine which secondary content 340 should be displayed. In another embodiment, application 320 may communicate each secondary-display event to a third party.

Figure 7:
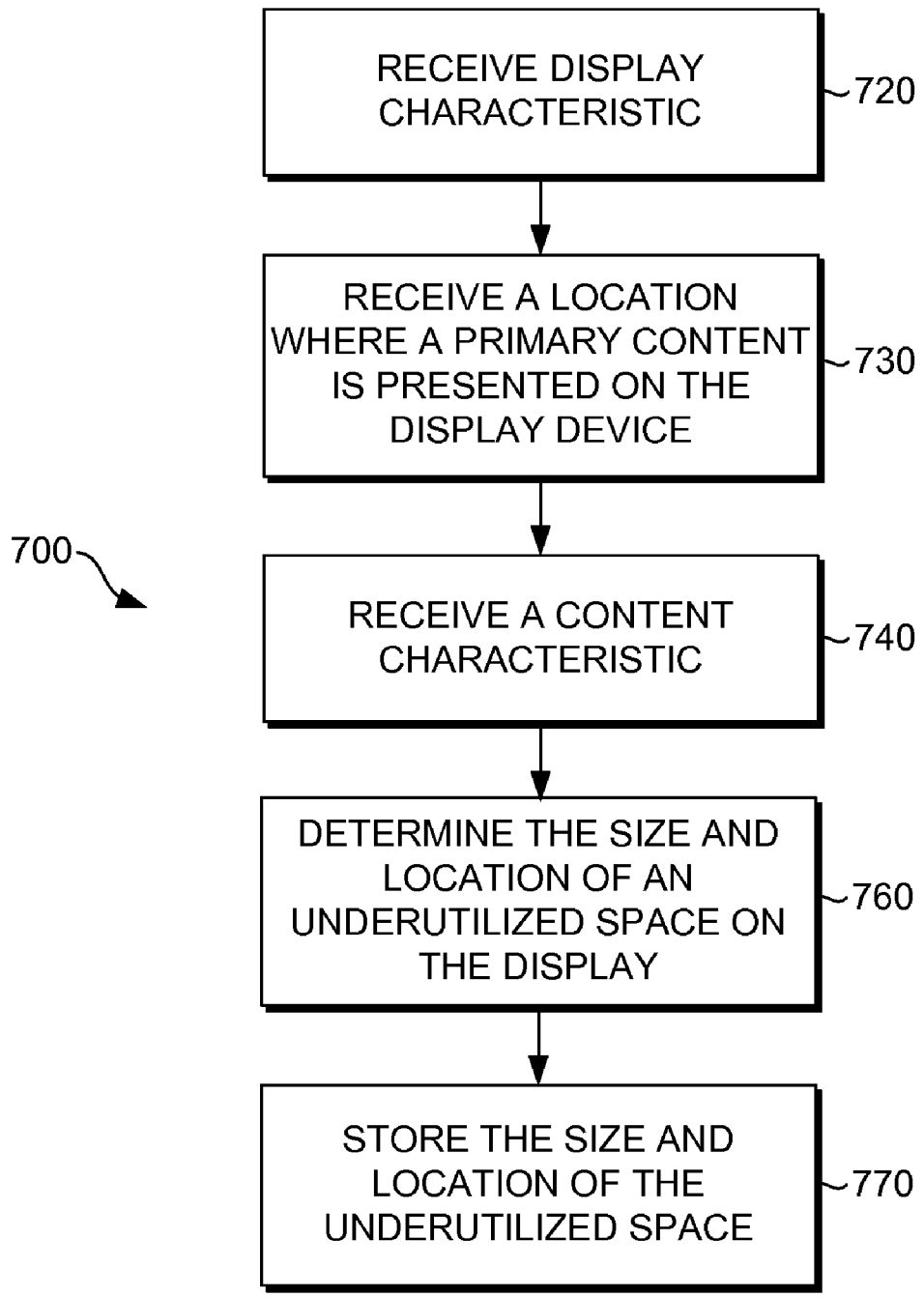
FIG. 7 is a flow diagram showing a method of determining if a display device contains underutilized space according to an embodiment of the present invention.

With reference to FIG. 7, a method of determining if a display device contains underutilized space is shown in accordance with an embodiment of the present invention. At step 720, a display characteristic for the display device is received. The display characteristic may include the screen dimensions or the display aspect ratio. The display dimensions may be measured in pixels. In one embodiment, the display aspect ratio may be calculated based on the screen dimensions. A display aspect ratio communicates the ratio of the display width to the display height. For example, the aspect ratio of a standard definition television is 4:3, whereas the aspect ratio of a high definition television is 16:9. At step 730, a location where a primary content 330 is presented on the display device 310 is received. For example, the primary content 330 may be centered in the display or it may be shifted to the top, bottom, right, or left. The characteristics received at steps 720 and 730 relate to characteristics of the display device 310. The manners in which these characteristics may be received have been explained previously with reference to FIG. 6.

At step 740, a content characteristic for the primary content 330 is received. The content characteristic may be a content aspect ratio or content dimensions. The content aspect ratio is the ratio of the width to the height of the primary content 330. The content dimensions may be measured in pixels. At step 740 the characteristics received relate to the primary content 330. The manners in which these characteristics may be received have been explained previously with reference to FIG. 6.

At step 760, at least the display device and primary content 330 characteristics received previously at steps 720, 730, and 740 are used to determine the dimensions and location of an underutilized space, if any. At step 770, the dimensions and location of any underutilized space on the display are stored. The stored dimensions and location of the underutilized space on the display may then be used to select secondary content 340 that may be optimized for the underutilized space. As explained previously, other technical and subject matter factors may also be used to select the secondary content, or make adjustments to the secondary content. Once received, the secondary content 340 may then be transmitted to the display device for display concurrently with the primary content 330.

When transmitting secondary content 340 to the display device 310, the secondary content 340 may be transmitted within the same signal as the primary content 330 or in a different signal. For example, when the display device is a television, application 320 may utilize a multiplexer, working in conjunction with a coder/decoder to merge the secondary content 340 into the single signal transmitted to the display device. In another embodiment, the secondary content 340 may be sent in a separate signal.

Figure 8:
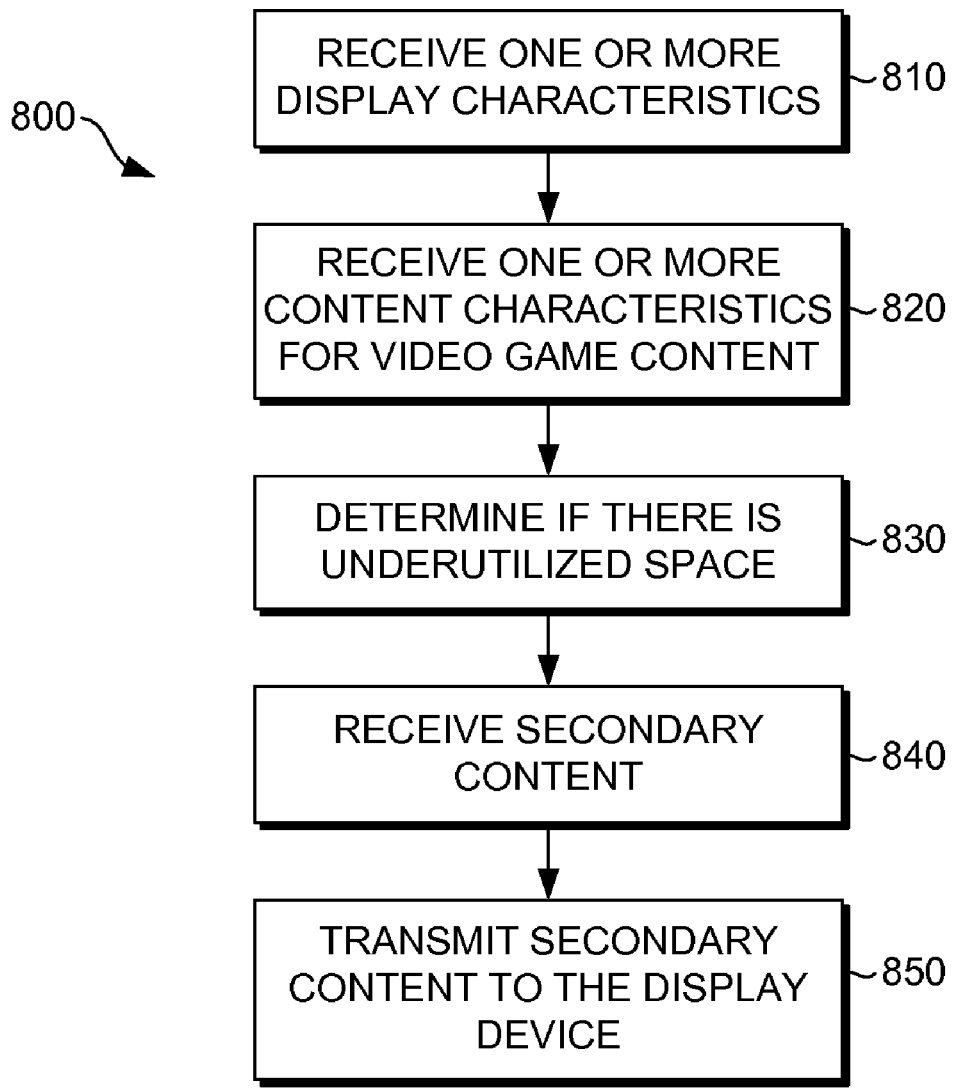
FIG. 8 is a flow diagram showing a method for providing a secondary content for presentation with video game content on a display device according to an embodiment of the present invention.

With reference to FIG. 8, a method 800 of displaying a secondary content 340 in an underutilized space on a display device 310 that is presenting a video game is shown in accordance with an embodiment of the present invention. At step 810, one or more display characteristics for the display device are received. By way of example, and not limitation, the display device may be a monitor, a high definition television, or a standard definition television, communicatively coupled to a game console. In another embodiment, the display is integrated into a hand-held video game player.

At step 820, one or more content characteristics for the video game being presented on the display device are received. At step 830, a determination is made regarding the presence or absence of an underutilized space on the display. Underutilized space is an area on the display device in which the video game content is not being presented. The dimensions and location of the underutilized space may be determined and used to select secondary content 340. At step 840, secondary content 340 is received. The secondary content 340 may be received from the same source as the primary content 330, or it may be received from a second, independent source. At step 850, the secondary content 340 is transmitted to the display device in such a way that the secondary content 340 is displayed on the display device within the underutilized space and concurrently with the video game content. Underutilized space may be found on display devices presenting an older, arcade video game, which may have an aspect ratio that fits a unique display in the arcade cabinet. By way of example, and not limitation, aspect ratios used in older arcade games include, 3:4, 4:3, 8:7, 16:15. This leaves underutilized space around the video game when it is displayed on many televisions and monitors. The secondary content 340 could be an advertisement for other video games, or products. The secondary content 340 could also be secondary game content, such as addition game graphics or statistics. The secondary content 340 may be pre-selected to coincide with a probable audience viewing the video game. The secondary content source and primary content source may be the same or different.

Thus, embodiments of the present invention determine if underutilized space will be present on a display device and may seek to display secondary content within the underutilized space. Embodiments of the present invention may be practiced on a wide variety of devices. Similarly, embodiments of the present invention may be utilized in conjunction with a wide variety of primary content mediums, such as movies and video games. Accordingly, in one embodiment, one or more computer-readable media having computer-executable instructions embodied thereon for performing a method that adds a secondary content to an underutilized space on a display device is provided. The method includes receiving one or more display characteristics for the display device, and one or more content characteristics for a primary content. The method further includes, determining if presentation of the primary content on the display device would result in an underutilized space on the display device. An underutilized space is an area on the display device not occupied by the primary content. Having determined if underutilized space exists, the secondary content for presentation within the underutilized space is received and transmitted to the display device, so that the secondary content is displayed on the display device within the underutilized space and concurrently with the primary content.

In yet another embodiment, one or more computer-readable media having computer-executable instructions embodied thereon for performing a method of determining if a display device contains underutilized space is provided. Underutilized space is an area on the display device not occupied by the primary content. The method includes receiving a display characteristic, such as the screen dimensions or aspect ratio. Receiving a content location where a primary content is to be presented on the display device, and receiving a content characteristic such as an aspect ratio for the primary content, or content dimensions. Using the display characteristic, the content characteristic, and the content location, the dimensions and location of the underutilized space on the display device is determined. The size and location of the underutilized space is stored for later use.

In another embodiment, an apparatus containing a processor, and one or more computer readable media that are programmed to include a method for displaying a secondary content in an underutilized space on a display device that is presenting a video game is provided. The method includes receiving one or more display characteristics for the display device, and one or more content characteristics for a video game. The method further includes, determining if presentation of the video game on the display device would result in an underutilized space on the display device. An underutilized space is an area on the display device not occupied by the primary content. Having determined if underutilized space exists, the secondary content for presentation within the underutilized space is received and transmitted to the display device, so that the secondary content is displayed on the display device within the underutilized space and concurrently with the video game.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer storage devices having computer-executable instructions embodied thereon for performing a method that adds a secondary content to an underutilized space on a display device, the method comprising:

receiving one or more content characteristics for a primary content;

determining that presentation of the primary content on the display device results in the underutilized space on the display device by comparing one or more display characteristics of the display device with the one or more content characteristics, wherein the underutilized space is an area on the display device not occupied by the primary content;

sending a request for the secondary content to a media source, wherein the request includes information about a subject matter of the primary content, dimensions of the underutilized space, and a screen location of the underutilized space;

receiving the secondary content for presentation within the underutilized space; and transmitting the secondary content to the display device, such that the secondary content is displayed on the display device within the underutilized space and concurrently with the primary content.

2. The one or more computer storage media devices of claim 1, wherein the display device includes one or more of the following:
    a high definition television;
    a standard definition television;
    a computer monitor;
    a display on a mobile phone;
    a display on a digital music player;
    a video billboard;
    a display on a personal data assistant; and
    a handheld video game player.

3. The one or more computer storage media devices of claim 1, wherein the primary content includes one or more of the following:
    a television show;
    a movie;
    a video;
    a slide show;
    a music video;
    an advertisement; and
    a video game.

4. The one or more computer storage media devices of claim 1, wherein the secondary content includes one or more of the following:
    an advertisement;
    a video advertisement;
    an image advertisement;
    a linked advertisement containing a hyperlink to additional secondary content;
    a linked advertisement containing a hyperlink to web page accessed via the Internet; and
    an interactive advertisement that is configured to perform an action in response to input received from a content viewer.

5. The one or more computer storage devices of claim 1, wherein the request for the secondary content to a media source further comprises
    information describing a presumptive primary content viewer.

6. The one or more computer storage devices of claim 1, wherein the primary content is received from a source that includes one or more of the following:
    a DVD;
    a CD-ROM;
    a game disc;
    a hard drive;
    a flash memory;
    a cable connection;
    an Internet connection;
    a radio signal sent over a mobile telephone network;
    a radio signal sent via a satellite; and
    a radio signal sent via a TV transmitting tower.

7. The one or more computer storage media devices of claim 1, wherein the display characteristics include one or more of the following:
    a display aspect ratio, and display dimensions.

8. One or more computer storage media devices having computer-executable instructions embodied thereon for performing a method of determining if a display device contains underutilized space, the method comprising:
    receiving a display characteristic that includes one or more of the following: screen dimensions for the display device, and a display aspect ratio for the display device;
    receiving a content location where a primary content is to be presented on the display device;
    receiving a content characteristic that includes one or more of the following: a content aspect ratio for the primary content and content dimensions for the primary content;
    determining dimensions and location of the underutilized space on the display device using at least the display characteristic, the content characteristic, and the content location, wherein the underutilized space is an area on the display device not occupied by the primary content;
    communicating, to a media source, a request for secondary content that includes the dimensions and location of the underutilized space;
    receiving a secondary content that is configured to be displayed within the dimensions and location of the underutilized space;
    transmitting the secondary content to the display device, such that the secondary content is displayed on the display device within the underutilized space concurrently with the primary content, thereby generating a secondary-display event;
    recording details of the secondary-display event, wherein the secondary-display event is a single instance of displaying a secondary content; and
    communicating details of the secondary-display event to a tracking entity.

9. The one or more computer storage devices of claim 8, wherein the method further comprises:
    communicating information about a subject matter of the primary content to the media source to facilitate receiving an optimized secondary content.

10. The one or more computer storage devices of claim 8, wherein the method further comprises:
    receiving the secondary content from a media source that is accessed using the Internet.

11. The one or more computer storage devices of claim 10, wherein the method further comprises:
    sending, to the media source to facilitate receiving an optimized secondary content, one or more of: information about a presumptive content viewer and information about a subject matter of the primary content.

12. The one or more computer storage devices of claim 8, wherein the secondary content is an advertisement.

13. The one or more computer storage devices of claim 12, wherein the tracking entity is an online advertising exchange.

14. The one or more computer storage devices of claim 8, wherein the method further comprises:
    receiving a secondary content; and
    facilitating a transmission of the secondary content to the display device in a first signal that contains the primary content.

15. The one or more computer storage devices of claim 8, wherein the method further comprises:
    receiving a secondary content, wherein the secondary content is content that is configured for placement within the underutilized space; and facilitating a transmission of the secondary content to the display device in a second signal, wherein the primary content is sent to the display device in a first signal.

16. The one or more computer storage devices of claim 8, wherein the primary content includes one or more of the following:
- a television show;
- a movie;
- a video;
- a music video;
- an advertisement; and a video game.

17. The one or more computer storage devices of claim 8, wherein the display device includes one or more of the following:
- a high definition television;
- a standard definition television;
- a computer monitor;
- a display on a mobile phone;
- a display on a digital music player;
- a video billboard;
- a display on a personal data assistant; and a handheld video game player.

18. An apparatus containing a processor, and one or more computer-readable media including instructions for performing a method for displaying a secondary content in an underutilized space on a display device that is presenting a video game, the method comprising:
- receiving one or more display characteristics for the display device;
- receiving one or more content characteristics for the video game;
- determining that presentation of the video game on the display device results in the underutilized space on the display device by comparing the one or more display characteristics with the one or more content characteristics, wherein the underutilized space is an area on the display device not occupied by the primary content;
- communicating a request for secondary content to a media source, wherein the request includes the dimensions of the underutilized space, a screen location of the underutilized space and information about a subject matter of the video game to facilitate receiving a secondary content that complements the subject matter of the video game;
- receiving the secondary content, wherein the secondary content is adapted for presentation within the underutilized space; and
- transmitting the secondary content to the display device, such that the secondary content is displayed on the display device within the underutilized space and concurrently with the video game.

19. The apparatus of claim 18, wherein at the secondary content includes one a video advertisement;
- an image advertisement;
- an advertisement containing a hyperlink to additional secondary content;
- an advertisement containing a hyperlink to web page accessed via the Internet;
- and an interactive advertisement that is configured to perform an action in response to input received from a content viewer.

20. The apparatus of claim 18, wherein the method further comprises:
- choosing the secondary content based on a subject matter of the video game.

* * * * *